US008605225B2

(12) United States Patent
Ramesh et al.

(10) Patent No.: US 8,605,225 B2
(45) Date of Patent: Dec. 10, 2013

(54) SYSTEM AND METHOD TO REDUCE CHANNEL ACQUISITION AND CHANNEL SWITCH TIMINGS IN COMMUNICATION RECEIVERS

(75) Inventors: Sunil Hosur Ramesh, Karnataka (IN); Gururaj Padaki, Karnataka (IN); Abdul Aziz, Karnataka (IN); Parag Naik, Karnataka (IN)

(73) Assignee: Saankhya Labs Pvt. Ltd., Bangalore, Karnataka (IN)

( * ) Notice: Subject to any disclaimer, the term of this patent is extended or adjusted under 35 U.S.C. 154(b) by 49 days.

(21) Appl. No.: 13/433,819

(22) Filed: Mar. 29, 2012

(65) Prior Publication Data

US 2012/0249887 A1    Oct. 4, 2012

(30) Foreign Application Priority Data

Mar. 31, 2011  (IN) .......................... 1085/CHE/2011

(51) Int. Cl.
*H04N 5/50*    (2006.01)
(52) U.S. Cl.
USPC ....................................................... 348/732
(58) Field of Classification Search
USPC ......... 348/726, 725, 731, 732, 553, 705, 706; 725/38, 95, 131, 139, 151; 455/150.1, 455/179.1, 185.1, 509
See application file for complete search history.

(56) References Cited

U.S. PATENT DOCUMENTS

| 7,523,482 | B2 * | 4/2009 | Barrett et al. ................. 725/120 |
| 7,562,375 | B2 * | 7/2009 | Barrett et al. ................... 725/38 |
| 7,636,934 | B2 * | 12/2009 | Baldwin et al. ............... 725/101 |
| 7,692,727 | B2 * | 4/2010 | Yoon ............................. 348/732 |
| 7,872,690 | B2 | 1/2011 | Ha |
| 8,135,040 | B2 * | 3/2012 | Cuijpers et al. ............... 370/486 |
| 8,327,397 | B2 * | 12/2012 | Cho ................................. 725/32 |
| 2004/0003399 | A1 * | 1/2004 | Cooper ........................... 725/38 |
| 2004/0128694 | A1 * | 7/2004 | Bantz et al. ..................... 725/95 |
| 2004/0181813 | A1 * | 9/2004 | Ota et al. ....................... 725/131 |
| 2005/0229221 | A1 * | 10/2005 | Kerofsky et al. ............. 725/100 |
| 2007/0006257 | A1 | 1/2007 | Shin et al. |
| 2007/0280298 | A1 * | 12/2007 | Hearn et al. .................. 370/498 |
| 2008/0209499 | A1 * | 8/2008 | Ramesh et al. ............... 725/138 |
| 2009/0183196 | A1 * | 7/2009 | Chen et al. ...................... 725/31 |
| 2010/0111197 | A1 | 5/2010 | Jiang et al. |
| 2010/0251296 | A1 * | 9/2010 | Kim et al. ....................... 725/38 |

FOREIGN PATENT DOCUMENTS

EP    1 025 697 B1    6/2010

\* cited by examiner

*Primary Examiner* — Paulos M Natnael
(74) *Attorney, Agent, or Firm* — Mendelsohn, Drucker & Dunleavy, P.C.; Steve Mendelsohn

(57) ABSTRACT

A Television (TV) receiver for faster channel switch times between a plurality of broadcasting TV channels with reduced latency in overall demodulation cycle for multiple demodulation standards is provided. The TV receiver includes a tuner that receives the broadcasting TV channels from a broadcasting system, performs a tuning operation, and sets a desired frequency for each of the broadcasting TV channels during a channel scan operation. A demodulator demodulates each of the broadcasting TV channels and acquires one or more acquisition channel parameters of each of the broadcasting TV channels during the channel scan operation. An application processor is coupled to the demodulator via a low throughput interface. The application processor performs a read operation and a write operation of the acquisition channel parameters to memory mapped registers on the demodulator when a channel status switches from a first state to a second state.

12 Claims, 9 Drawing Sheets

| VIRTUAL CHANNEL | MODULATION TYPE | PROGRAMS |
|---|---|---|
| CH 1 | DIGITAL TERRESTRIAL | PROGRAM 1, PROGRAM 2, PROGRAM 3 |
| CH 2 | DIGITAL TERRESTRIAL | PROGRAM 1, PROGRAM 2 |
| CH 3 | DIGITAL TERRESTRIAL | PROGRAM 1, PROGRAM 2, PROGRAM 3, PROGRAM 4 |
| CH 4 | ANALOG TERRESTRIAL | PROGRAM 1 |
| CH 5 | ANALOG TERRESTRIAL | PROGRAM 1 |
| CH 6 | DIGITAL CABLE | PROGRAM 1, PROGRAM 2, ..... PROGRAM 6 |
| CH 7 | DIGITAL CABLE | PROGRAM 1, PROGRAM 2, PROGRAM 3 |
| CH 8 | DIGITAL CABLE | PROGRAM 1, PROGRAM 2, PROGRAM 3 |
| CH 9 | ANALOG CABLE | PROGRAM 1 |
| CH 10 | ANALOG CABLE | PROGRAM 1 |

FIG. 2 (PRIOR ART)

| ACQUISITION CHANNEL PARAMETERS | STANDARDS | | | | | | |
|---|---|---|---|---|---|---|---|
| | ATSC | DVB-T | CABLE | ANALOG | DMB-T (MULTI CARRIER) | ISDB-T | DMB-T (SINGLE CARRIER) |
| CARRIER FREQUENCY OFFSET CFO | ✓ | ✓ | ✓ | | ✓ | ✓ | ✓ |
| SAMPLING TIMING OFFSET (STO) | ✓ | ✓ | ✓ | | ✓ | ✓ | ✓ |
| TIME DOMAIN EQUALIZER TAPS | ✓ | | ✓ | | | | ✓ |
| SYNC MARKERS | ✓ | ✓ | | | | | |
| MODULATION PARAMETERS (GI, FFT, MODE) | | ✓ | | | ✓ | ✓ | |
| AGC GAIN | ✓ | ✓ | ✓ | ✓ | ✓ | ✓ | ✓ |

FIG. 5

SYSTEM AND METHOD TO REDUCE CHANNEL ACQUISITION AND CHANNEL SWITCH TIMINGS IN COMMUNICATION RECEIVERS

BACKGROUND

1. Technical Field

The embodiments herein generally relate to receivers, and, more particularly to system and method to reduce channel acquisition and channel switch timings in demodulators and to reduce latency in overall demodulation cycle for multiple demodulation standards in communication receivers.

2. Description of the Related Art

Currently, television broadcasts all over world, include either digital and analog transmission which can be done via either of cable or terrestrial transmissions. A communication system is capable of tuning to both analog and digital signals received via either of terrestrial and cable transmissions. When a channel scan is run on a television, it has to scan channels from different transmissions (e.g., from digital terrestrial channel to analog cable channel and then to analog terrestrial channel to digital cable channel, etc.).

FIG. 1 is a typical block diagram of broadcasting one or more signals to a television system (e.g., a communication system). The block diagram includes an RF tuner 102, a demodulator 104, a media processor 106, and a display device 108. Channel scan cycle begins with the media processor 106 setting up the RF tuner 102 and the demodulator 104. If a Software Defined Radio (SDR) demodulator is used, demodulation standard is set up by downloading a standard specific code. The RF tuner 102 is tuned to a required frequency. In case of digital channels received either through cable or terrestrial transmissions, the demodulator 104 provides a Signal Lock (SL) status when a Transport Stream (TS) packet is received by the media processor 106. Upon receipt of the TS packet by the media processor 106, the TS packets are parsed, and channel information that corresponds to audio and video content is recorded. Thereafter, the media processor 106 builds a channel database based on the information recorded.

After the entire digital spectrum is scanned, the media processor 106 switches the demodulation standard on the demodulator 104 from digital to analog for both cable and terrestrial analog transmissions. The media processor 106 downloads a code relevant to analog channel scans. Thereafter, another scan for the entire analog transmission spectrum begins. In case of analog cable or terrestrial broadcasts, the RF tuner 102 provides a Signal Lock Status if the channel tuned to is active. The media processor 106 builds a channel database based on the information received.

With reference to FIG. 1, FIG. 2 is a table view illustrating a typical channel database built by the media processor 106 of FIG. 1 upon receiving information during digital and analog channel scans via both cable and terrestrial transmissions. The channel database includes a virtual channel field 202, a modulation type field 204, and a programs field 206. The channel database lists important channel parameters as information pertaining to a channel number, a modulation type for a channel, and a list of corresponding programs running on the channel.

Initial setup time is involved when a demodulation standard is setup on an SDR based demodulator. The setup time is essentially a time taken to download a relevant code. After the code is downloaded, the RF tuner 102 tunes into a specific frequency and outputs Intermediate Frequency (IF) data to the demodulator 104. Upon receiving the IF data, the demodulator 104 goes through an acquisition state followed by a tracking state. Thereafter, the demodulator 104 outputs (i) a TS packet for digital channels/standards and (ii) a Sound Intermediate Frequency (SIF) signal and/or a Composite Video Baseband Signal (CVBS) for analog channels/standards. The acquisition time for the demodulator 104 varies from one demodulation standard to another. During the acquisition state, a plurality of parameters are estimated which contribute towards time taken to perform a channel scan operation and also time taken during a channel change operation.

A channel change may include either a channel change within a single major channel in digital broadcasts (e.g., Channel 1, Programme 1 to Channel 1, Programme 2 of FIG. 2), or a channel change involves a change in frequency band from digital broadcast to digital broadcast with the same modulation type (e.g., a digital terrestrial to a digital terrestrial of FIG. 2). The channel change may also include a channel change involving change in frequency band but with a different modulation type (e.g., a digital terrestrial to a digital cable of FIG. 2).

When there is a channel change within the single major channel in digital broadcasts, the demodulator 104 is not required to perform any specific action. The media processor 106 handles a request for a channel change in such scenario. When there is a channel change within the same modulation type but involves a change in frequency band, the media processor 106 sets up the RF tuner 102 for the frequency change. The demodulator 104 loses synchronization since a new TS packet is received. The demodulator 104 then triggers the process of acquisition and tracking before outputting a Transport Stream (TS) to the media processor 106. The time taken to for this process increases the time of channel change.

When there is a channel change involving change in frequency band with a different modulation type, the media processor 106 sets up the RF tuner 102 for a frequency change. If the demodulator 104 is SDR based, a new code is downloaded. The demodulator 104 then triggers the process of acquisition and tracking before outputting (i) a TS packet to the media processor 106 for digital channels and (ii) CVBS output for analog channels. In such a scenario, the duration of code download further increases the time of channel change.

Currently, a channel scan operation and a channel change operation both have acquisition and tracking cycles which introduce latency in a demodulation cycle. During the channel change, the demodulator 104 has to go through the acquisition and tracking phases again which further add to the latency and channel change and scan timings. Accordingly, there remains a need for a demodulation system that reduces latencies introduced in one or more demodulation cycles each time a channel scan operation or a channel change operation is performed.

SUMMARY

In view of the foregoing, an embodiment herein provides a Television (TV) receiver for faster channel switch times between a plurality of broadcasting TV channels with reduced latency in overall demodulation cycle for multiple demodulation standards. The TV receiver includes a tuner that receives the plurality of broadcasting TV channels from a broadcasting system. The tuner performs a tuning operation and sets a desired frequency for each of the broadcasting TV channels during a channel scan operation. A demodulator is coupled to the tuner. The demodulator demodulates each of the broadcasting TV channels and acquires one or more acquisition channel parameters of each of the broadcasting TV channels during the channel scan operation.

An application processor is coupled to the demodulator via an interface. The application processor performs a read operation and a write operation of the acquisition channel parameters to memory mapped registers on the demodulator when a channel status switches from a first state to a second state. The application processor downloads at least one of a compression code, an acquisition mode code, and a tracking mode code on to the demodulator when the channel switch status changes for different modulation types based on the acquisition channel parameters.

The application processor includes a channel list database that stores the acquisition channel parameters that correspond to each of the broadcasting TV channels. The application processor updates the channel list database with the acquisition channel parameters and forceably initializes at least one required acquisition channel parameter from the acquisition channel parameters when the channel status switches from one state to another state. The application processor performs the read operation and the write operation of a tap value of time domain equalizer acquisition channel parameters for a single carrier based digital demodulation standard.

The application processor further performs the read operation and the write operation of a Fast Fourier Transform (FFT) mode estimate, a guard interval estimate, and a frequency/sampling time locking acquisition channel parameter on the demodulator for a multi-carrier cyclic prefix based OFDM digital demodulation standard. Only the tracking mode code is transferred based on different modulation types on received acquisition channel parameters. The application processor further performs the read operation and the write operation of (i) a Carrier Frequency Offset (CFO) estimate and (ii) an Automatic Gain Control (AGC) value for multiple digital and analog demodulation standards.

Binary data for the codes is transferred on a stage basis. The compression code reduces transfer code timing for the binary data. Only (i) the required tracking mode code and (ii) the read and write operations are over written on an acquisition mode code that corresponds to a particular acquisition channel parameter of the acquisition channel parameters.

In another aspect, a mobile television (TV) receiver for faster channel switch times between a plurality of broadcasting TV channels with reduced latency in overall demodulation cycle for multiple demodulation standards, is provided. The mobile TV receiver includes a memory unit having a set of instructions; a display unit coupled to the memory unit; a tuner that (i) receives the plurality of broadcasting TV channels from a broadcasting system (ii) performs a tuning operation, and (iii) sets a desired frequency for each of the broadcasting TV channels during a channel scan operation; and a demodulator that (i) demodulates each of the broadcasting TV channels and (ii) acquires at least one acquisition channel parameter of each of the broadcasting TV channels during the channel scan operation.

The TV receiver further includes an application processor that includes (i) a control processor that is coupled to the demodulator via an interface, (ii) a video and audio processing unit that processes video and audio content that corresponds to each of the plurality of broadcasting TV channels, and (iii) a channel list database. The application processor is adapted to (i) perform at least one of a read operation and/or a write operation of the acquisition channel parameters to memory mapped registers on the demodulator when a channel status switches from a first state to a second state, (ii) download at least one of (a) a compression code, (b) an acquisition mode code, and (c) a tracking mode code from the application processor on to the demodulator when the channel switch status changes for different modulation types based on the acquisition channel parameters, (iii) store and update the acquisition channel parameters that correspond to each of the broadcasting TV channels in the channel list database, and (iv) forceably initialize at least one required acquisition channel parameter from the acquisition channel parameters when the channel status switches from one state to another state.

In yet another aspect, a method of performing faster channel switch times between a plurality of broadcasting TV channels with reduced latency in overall demodulation cycle for multiple demodulation standards in a mobile Television (TV) receiver, is provided. The method includes (i) receiving the broadcasting TV channels from a broadcasting system, (ii) tuning and setting a desired frequency for each of the broadcasting TV channels during a channel scan operation, (iii) demodulating each of the broadcasting TV channels, (iv) acquiring at least one acquisition channel parameter of each of the broadcasting TV channels during the channel scan operation, and (v) performing at least one of a read operation or a write operation of the acquisition channel parameters to memory mapped registers on a demodulator using an interface when a channel status switches from a first state to a second state.

The method further includes (i) storing the acquisition channel parameters that correspond to each of the broadcasting TV channels in a channel list database, (ii) forceably initializing at least one required acquisition channel parameter from the acquisition channel parameters when the channel status switches from the second state to a third state, and (iii) updating the channel list database with the acquisition channel parameters when the channel status switches from one state to another state.

In a yet further aspect, a communication receiver for faster channel switch times between a plurality of communication channels with reduced latency in overall demodulation cycle for multiple demodulation standards, is provided. The communication receiver includes (i) a tuner that (a) receives the plurality of communication channels from a communication system, (b) performs a tuning operation, and (c) sets a desired frequency for each of the communication channels during a channel scan operation, (ii) a demodulator that (a) demodulates each of the communication channels and (b) acquires at least one acquisition channel parameter of each of the communication channels during the channel scan operation, and (iii) an application processor coupled to the demodulator via a low throughput interface.

The application processor performs at least one of a read operation and a write operation of the acquisition channel parameters to memory mapped registers on the demodulator when a channel status switches from a first state to a second state. The application processor downloads at least one of a reduced compression code, an acquisition mode code, and a tracking mode code on to the demodulator when the channel switch status changes for different modulation types based on the acquisition channel parameters. The application processor includes a channel list database that stores the acquisition channel parameters that correspond to each of the communication channels. The application processor updates the channel list database with the acquisition channel parameters and forceably initializes at least one required acquisition channel parameter from the acquisition channel parameters when the channel status switches from one state to another state.

The application processor performs the read operation and said write operation of (i) a Carrier Frequency Offset (CFO) estimate and (ii) an Automatic Gain Control (AGC) value for multiple digital and analog demodulation standards. Binary data for the codes is transferred on a stage basis. The application processor further (i) transfers (a) the acquisition mode code and (b) the tracking mode code on the demodulator. Only (i) the required tracking mode code and (ii) the read and write operations are over written on an acquisition mode code that corresponds to a particular acquisition channel parameter of the acquisition channel parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2 is a table view illustrating a typical channel database built by the media processor of FIG. 1 upon receiving information during digital and analog channel scans via both cable and terrestrial transmissions;

FIG. 5 is a table view illustrating the one or more acquisition channel parameters that are read and/or written by the media processor on the demodulator of FIG. 3 for one or more transmission standards according to an embodiment herein;

DETAILED DESCRIPTION OF PREFERRED EMBODIMENTS

Figure 1:
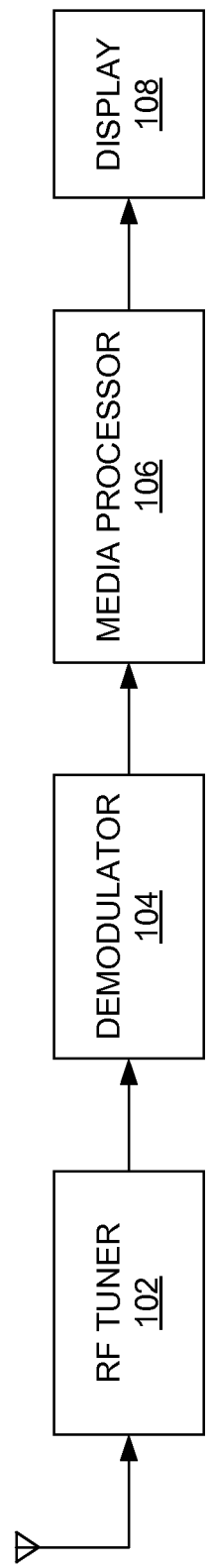
FIG. 1 is a typical block diagram of receiving one or more television system broadcast signals.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a demodulation system that reduces latencies introduced in one or more demodulation cycles each time a channel scan operation or a channel switch operation is performed. The embodiments herein achieve this by providing an application processor that performs a read operation and/or a write operation on one or more acquisition channel parameters during a channel scan operation and thus reduces channel switch times between the broadcasting channels. Referring now to the drawings, and more particularly to FIG. 3 through FIG. 9, where similar reference characters denote corresponding features consistently throughout the figures, there are shown preferred embodiments.

Figure 3:
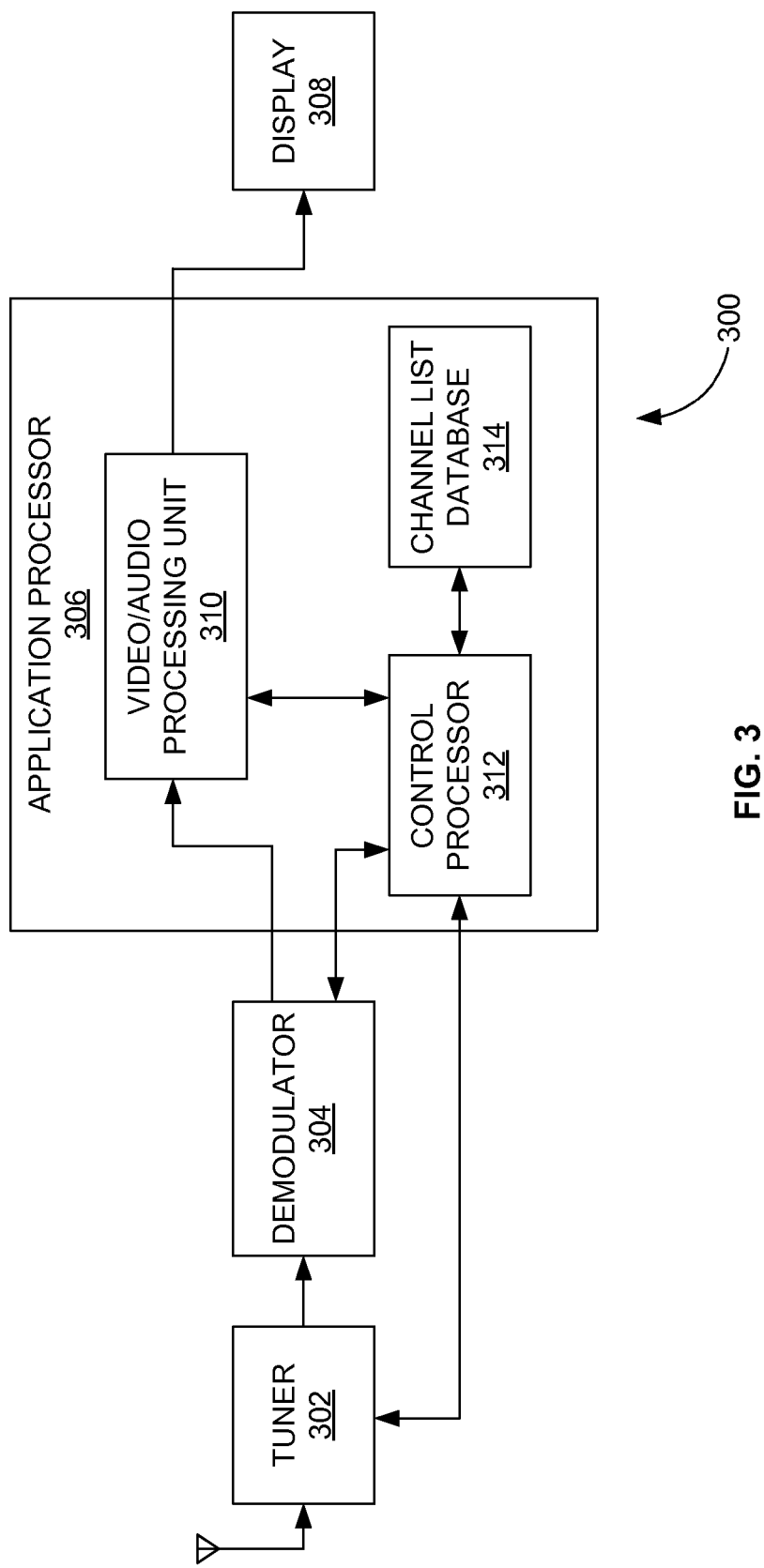
FIG. 3 is a block diagram of a communication receiver according to an embodiment herein.

FIG. 3 is a block diagram of a communication receiver 300 according to an embodiment herein. The communication receiver 300 includes a tuner 302, a demodulator 304, an application processor 306, and a display 308. The application processor 306 includes a video/audio processing unit 310, a control processor 312, and a channel list database 314. In one embodiment, the communication receiver is any type of a receiver that is capable of performing faster channel switch times between broadcasting TV channels and thus reduces latency in overall demodulation cycle for multiple demodulation standards. For instance, a Television (TV) receiver is considered as an example. The TV receiver 300 enables faster channel switch times between a plurality of broadcasting TV channels and thus reduces latency in overall demodulation cycle for multiple demodulation standards. In one embodiment, the TV receiver 300 is a mobile TV receiver.

The tuner 302 and the demodulator 304 also directly communicate with the control processor 312. The tuner 302 receives the one or more broadcasting TV channels from a broadcasting system and performs a tuning operation. The tuner 302 further sets a desired frequency for each of the broadcasting TV channels during a channel scan operation. The demodulator 304 is coupled to the tuner 304. The demodulator 304 demodulates each of the broadcasting TV channels and acquires one or more acquisition channel parameters for each of the broadcasting TV channels during the channel scan operation.

The application processor 306 is coupled to the demodulator 304 via an interface. In one embodiment, the interface is a low throughput interface or a two wire interface. The application processor 306 performs one or more read operations and/or one or more write operations (e.g., one or more set back operations) of the acquisition channel parameters to memory mapped registers on the demodulator 304 when a channel status switches from a first state to a second state (e.g., from a broadcasting channel 1 to a broadcasting channel 2 of FIG. 2). In one embodiment, the two-wire interface enables the application processor 306 to perform the read operations and/or the write operations of the one or more acquisition channel parameters on the demodulator 304.

Further, the application processor 306 downloads at least one of a compression code, an acquisition mode code, and/or a tracking mode code on to the demodulator 304 when the channel switch status changes for different modulation types based on the one or more acquisition channel parameters. In one embodiment, the demodulator 304 operates on a stage basis. These stages are essentially an acquisition mode and a tracking mode. Code transferred in an acquisition mode is the acquisition mode code. Code transferred in a tracking mode is the tracking mode code. The compression code reduces overall code size required for transferring in the above modes. The application processor 306 downloads these codes from a memory (within the application processor 306 of FIG. 3). In one embodiment, the memory is a flash drive that stores the compression code, the acquisition mode code, and/or the tracking mode code. In one embodiment, the compression code is the acquisition mode code and/or the tracking mode code that are being compressed. In one embodiment, the low throughput interface or the two wire interface can transfer data (e.g., the binary data of the codes) at the rate of a few tens of Kilobytes per second.

The video/audio processing unit 310 processes video and audio content that corresponds to each of the broadcasting TV channels. The control processor 312 is connected to the demodulator 304 via the 2-wire interface. The channel list database 314 stores the one or more acquisition channel parameters that corresponds to each of the one or more broadcasting TV channels.

Further, the application processor 306 updates the channel list database 314 with the one or more acquisition channel parameters and initializes one or more required acquisition channel parameters (e.g., one or more acquisition channel parameters) from the acquisition channel parameters when the channel status switches from one state to another state (e.g., from a broadcasting channel 1 to a broadcasting channel 'n'). In one embodiment, the two wire interface between the demodulator 304 and the application processor 306 enables the read operations and/or the write operations of the one or more acquisition channel parameters that are required to build and update the channel list database 314 when a channel scan operation and/or a channel switch operation is performed.

Further, this also enables the application processor 306 to read back the one or more acquisition channel parameters from the demodulator 304 and set the one or more acquisition channel parameters (e.g., perform a write operation of the one or more acquisition channel parameters) on the demodulator 304 whenever a channel switch is performed. In Software Defined Radio (SDR) based demodulators, the two wire interface enables the application processor 306 to download code in parallel for the acquisition and tracking modes of the demodulation cycle. In one embodiment, the application processor 306 transfers the acquisition mode code and the tracking mode code on the demodulator 304.

The compression code (e.g., the acquisition mode code, and the tracking mode code that are compressed) reduces the time that it takes to transfer a binary data of the codes on the demodulator 304. In one embodiment, only (i) the required tracking mode code and (ii) the one or more read operations and/or write operations are over written on an acquisition mode code that corresponds to a particular acquisition channel parameter of the one or more acquisition channel parameters. Transfer of the binary data of the codes is performed on a stage basis (e.g., the stages include the tracking mode, and the acquisition mode). In one embodiment, the communication receiver 300 is any other similar receiver that performs faster channel switch times between the communication channels with reduced latency in overall demodulation cycle for multiple demodulation standards.

Further, the multiple demodulation standards may be a 3G standard, a Wi-Fi standard, a LTE standard, a Bluetooth standard, or any other such standards. The other similar communication receiver include similar one or more block/components such as the tuner 302, the demodulator 304, the application processor 306, the display 308, the video/audio processing unit 310, the control processor 312, and the channel list database 314. The above components 302-314 perform the same functions as described above.

Further for other standards (e.g., the 3G standard, the Wi-Fi standard, the LTE standard, the Bluetooth standard, or any other such standard), the application processor 306 performs the read operation and the write operation of (i) a Carrier Frequency Offset (CFO) estimate and (ii) an Automatic Gain Control (AGC) value for multiple digital and analog demodulation standards. The binary data of the codes is transferred on a stage basis. Further, the application processor 306 transfers the acquisition mode code and the tracking mode code on the demodulator. Further compressing the binary data for the codes reduces the time it takes to transfer these codes to the demodulator 304. Additionally, for other standards as mentioned above, only (i) the required tracking mode code and (ii) the read and write operations are over written on an acquisition mode code that corresponds to a particular acquisition channel parameter of the acquisition channel parameters.

Figure 4:
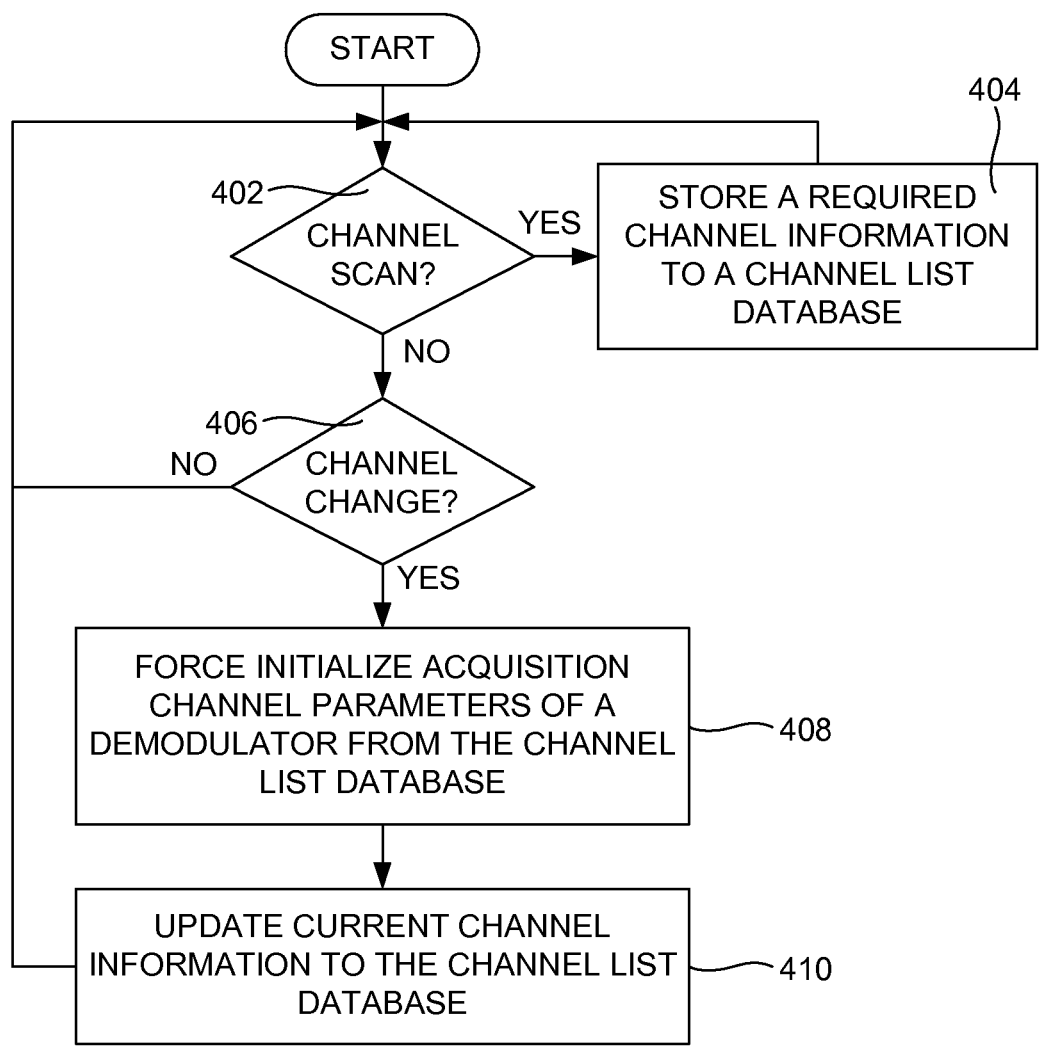
FIG. 4 is a flow diagram illustrating a method of a channel scan and a channel switch operation in the communication receiver of FIG. 3 according to an embodiment herein.

FIG. 4 is a flow diagram illustrating a method of a channel scan and a channel switch operation in the communication receiver 300 of FIG. 3 according to an embodiment herein. In step 402, it is checked whether a channel scan operation is required. If the channel scan operation is required, then required channel information (e.g., the one or more acquisition channel parameters) is stored in the channel list database 314 of FIG. 3 in step 404 and the step 402 is repeated. Else (if the result of step 402 is No), then it is checked whether a channel switch operation is to be performed in step 406. If the channel switch operation is to be performed, then the one or more acquisition channel parameters of the demodulator 304 are forceably initialized from the channel list database 314 in step 408.

In one embodiment, the one or more acquisition channel parameters of the demodulator 304 are forceably initialized by the application processor 306. Else (if the result of step 406 is No), then the step 402 is repeated. In step 410, current channel information (e.g., the one or more acquisition channel parameters) is updated to the channel list database 314, and the step 402 is repeated. In one embodiment, the application processor 314 updates the current channel information into the channel list database 314. In another embodiment, when a channel switch has been affected, a new set of acquisition channel parameters are stored in the channel list database 314 for future channel switch requests.

FIG. 5 is a table view illustrating the one or more acquisition channel parameters that are read and/or written by the application processor 306 on the demodulator 304 of FIG. 3 for one or more transmission standards according to an embodiment herein. The table view includes an acquisition channel parameters field 502, and a standards field 504. The acquisition channel parameters field 502 includes the one or more acquisition channel parameters such as a Carrier Frequency Offset (CFO), a Sampling Timing Offset (STO), Time Domain Equalizer Taps, Sync Markers, one or more modulation parameters, and/or an AGC Gain, etc. The one or more modulation parameters include a Guard Interval (GI) estimate, a Fast Fourier Transform (FFT), and/or a mode, etc.

The standards field 504 includes one or more standards such as an Advanced Television Systems Committee (ATSC) standard, a Digital Video Broadcasting-Terrestrial (DVB-T) standard, a Cable standard, an Analog standard, a Digital Multimedia Broadcast-Terrestrial (DMB-T) standard (multi-carrier), an Integrated Services Digital Broadcasting-Terrestrial (ISDB-T) standard, and a Digital Multimedia Broadcast-Terrestrial (DMB-T) standard (single-carrier). For the ATSC standard, the application processor 306 performs the read operation and/or the write operation of the Carrier Frequency Offset (CFO), the Sampling Timing Offset (STO), the Time Domain Equalizer Taps, the Sync Markers, and/or the AGC Gain on the demodulator 304.

For the DVB-T standard, the application processor 306 performs the read operation and/or the write operation of the Carrier Frequency Offset (CFO), the Sampling Timing Offset (STO), the Guard Interval (GI) estimate, the Fast Fourier Transform (FFT), the mode, and the AGC Gain on the demodulator 304. For the Cable standard, the application processor 306 performs the read operation and/or the write operation of the Carrier Frequency Offset (CFO), the Sampling Timing Offset (STO), the Time Domain Equalizer Taps, and the AGC Gain on the demodulator 304.

For the Analog standard, the application processor 306 performs the read operation and/or the write operation of the Carrier Frequency Offset (CFO) and/or the AGC Gain on the demodulator 304. For the Digital Multimedia Broadcast-Terrestrial (DMB-T) standard (multi-carrier), the application processor 306 performs the read operation and/or the write operation of the Carrier Frequency Offset (CFO), the Sampling Timing Offset (STO), the Guard Interval (GI) estimate, the Fast Fourier Transform (FFT), the mode, and the AGC Gain on the demodulator 304.

For the Integrated Services Digital Broadcasting-Terrestrial (ISDB-T) standard, the application processor 306 performs the read operation and/or the write operation of the Carrier Frequency Offset (CFO), the Sampling Timing Offset (STO), the Guard Interval (GI) estimate, the Fast Fourier Transform (FFT), the mode, and the AGC Gain on the demodulator 304. For the Digital Multimedia Broadcast-Terrestrial (DMB-T) standard (single-carrier), the application processor 306 performs the read operation and/or the write operation of the Carrier Frequency Offset (CFO), the Sampling Timing Offset (STO), the Time Domain Equalizer Taps, and the AGC Gain on the demodulator 304.

In one embodiment, the one or more acquisition channel parameters are settled acquisition channel parameters. In another embodiment, the ATSC standard, the Cable standard, the Analog standard, and/or the DMB-T standard are single carrier standards (e.g., a single carrier based digital demodulation standard). In yet another embodiment, the DVB-T standard, the DMB-T standard, and/or the ISDB-T standard are multi-carrier standards (e.g., a multi-carrier cyclic prefix based OFDM digital demodulation standards). In the above FIG. 5, only TV standards have been considered for instance as examples. The read and write operations can be performed on one or more acquisition parameters for other standards such as the 3G standard, the Wi-Fi standard, the LTE standard, the BlueTooth standard, or any other such standards.

Figure 6:
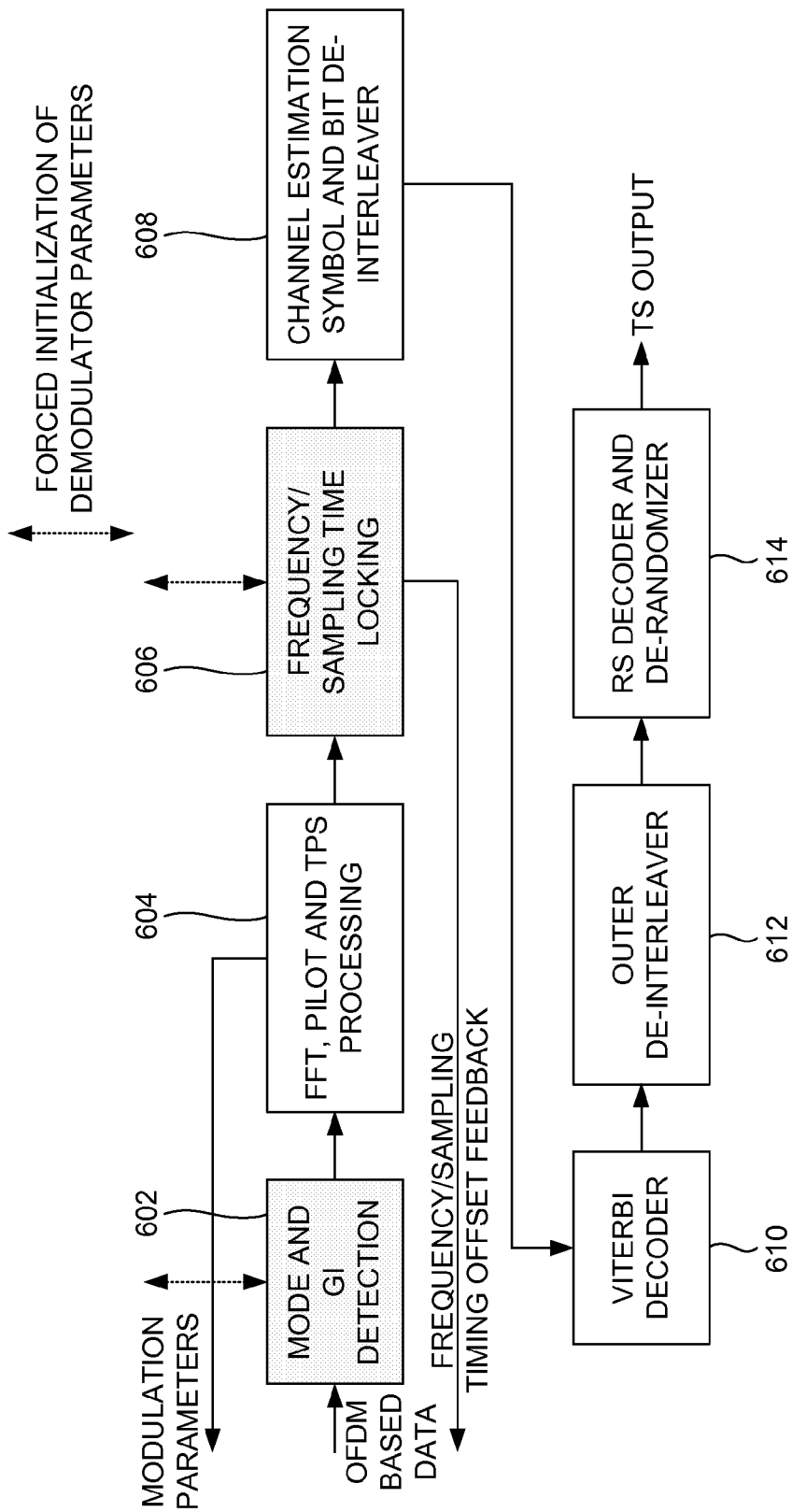
FIG. 6 is a block diagram of an OFDM based demodulation with Fast Channel Switch Logic (FCSL) of the demodulator of the communication receiver of FIG. 3 according to an embodiment herein.

With reference to FIG. 5, FIG. 6 is a block diagram of an OFDM based demodulation with Fast Channel Switch Logic (FCSL) of the demodulator 304 of the communication receiver 300 of FIG. 3 according to an embodiment herein. The block diagram of the OFDM based demodulation with Fast Channel Switch Logic (FCSL) for the receiver 300 includes a Mode and Guard Interval (GI) detection block 602, an FFT, Pilot and TPS processing block 604, a frequency/sampling time locking block 606, a channel estimation, symbol and bit de-interleaver block 608, a viterbi decoder block 610, an outer de-interleaver block 612, and an RS decoder and de-randomizer block 614.

The two wire interface between the demodulator 304 and the application processor 306 enables forced initialization of one or more acquisition channel parameters (e.g., demodulation parameters) whenever a channel switch is performed.

When a channel switch is performed, and the acquisition channel parameters have been acquired in the acquisition mode, the acquired parameters (e.g., the acquisition channel parameters) are read by the application processor 306 through the two wire interface to memory mapped registers and are stored in the channel list database 314.

When a channel scan is performed, the application processor 306 reads a plurality of settled acquisition channel parameters for each tuned channel and stores the plurality of settled acquisition channel parameters (e.g., the acquisition channel parameters) in the channel list database 314. When a channel switch is performed, the application processor 306 reads the settled acquisition channel parameters of the demodulator 304 for a current channel and updates the channel list database 314 and forceably initializes the required acquisition channel parameters to the demodulator 304 for a next channel.

In the OFDM based demodulation, the acquisition channel parameters (e.g., the Mode and the GI parameter) are forceably initialized and are set to accelerate a channel switch by the Mode and GI block 602. The frequency/sampling time locking parameter is forceably initialized and is set to accelerate a channel switch by the frequency/sampling time locking block 606. These parameters are stored by the application processor 306 and are forceably initialized when a channel switch is performed thereby reducing the channel switch timings.

Figure 7:
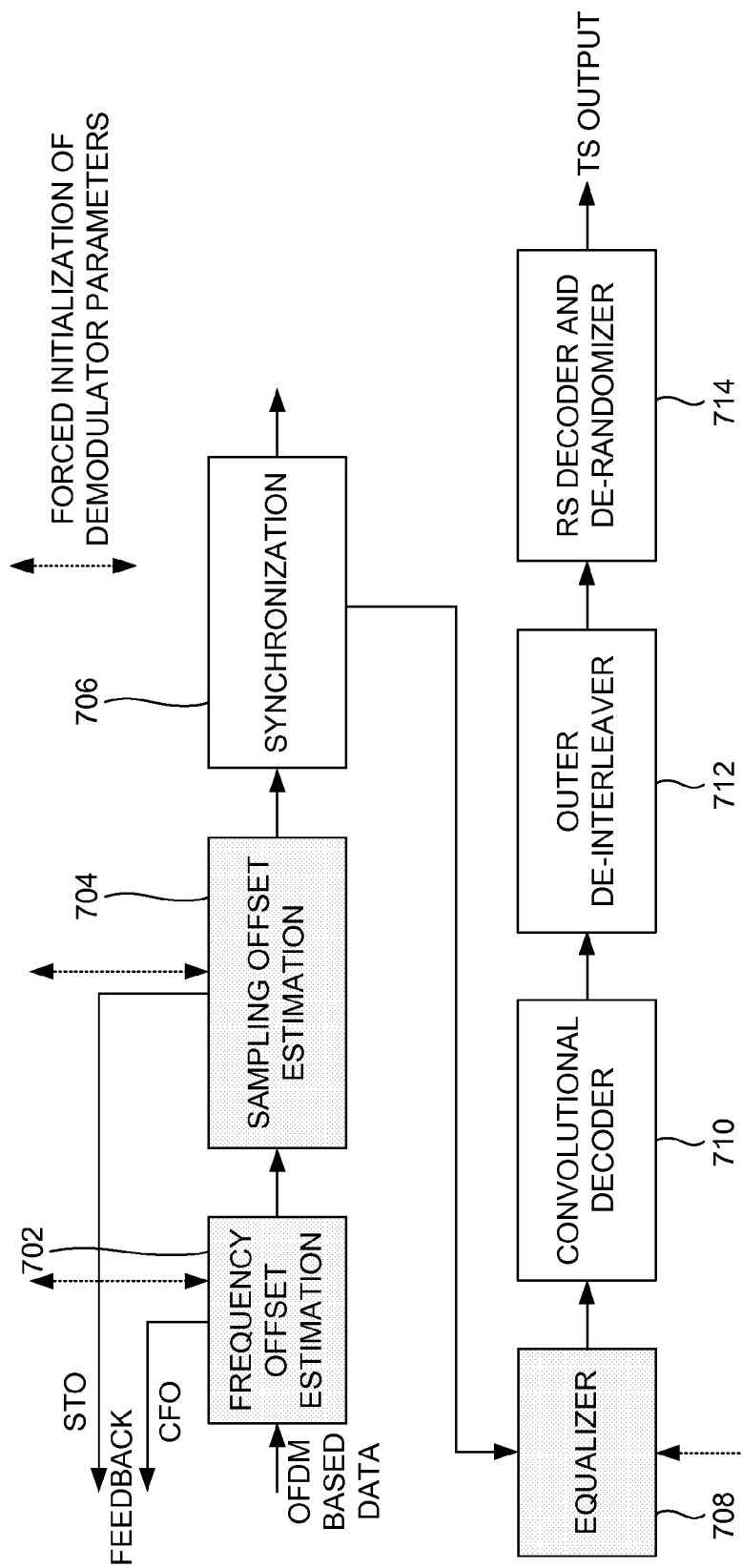
FIG. 7 is a block diagram of a Single Carrier based demodulation with a Fast Channel Switch Logic (FCSL) of the demodulator of the communication receiver of FIG. 3 according to an embodiment herein.

With reference to FIG. 5, FIG. 7 is a block diagram of a Single Carrier based demodulation with a Fast Channel Switch Logic (FCSL) of the demodulator 304 of the communication receiver 300 of FIG. 3 according to an embodiment herein. The block diagram of the Single Carrier based demodulation with the Fast Channel Switch Logic (FCSL) for the receiver 300 includes a Frequency Offset Estimation (FOE) block 702, a Sampling Offset Estimation (SOE) block 704, a Synchronization block 706, an Equalizer block 708, a Convolutional Decoder block 710, an Outer De-interleaver block 712, and an RS decoder and De-randomizer block 714. The block diagram depicts the effect of a two wire interface of the Single Carrier based demodulation standard with the application processor 306.

The acquisition channel parameter (e.g., the Carrier Frequency Offset (CFO)) is forceably initialized and set to accelerate a channel switch by the FOE block 702. Similarly, the Sample Timing Offset (STO) parameter is forceably initialized and set to accelerate a channel switch by the SOE block 704. Further, the Time Domain Equalizer Taps are forceably initialized and set to accelerate a channel switch by the Equalizer block 708. These parameters are stored by the application processor 306 and are forceably initialized when a channel switch is performed thereby reducing the channel switch timings.

Figure 8:
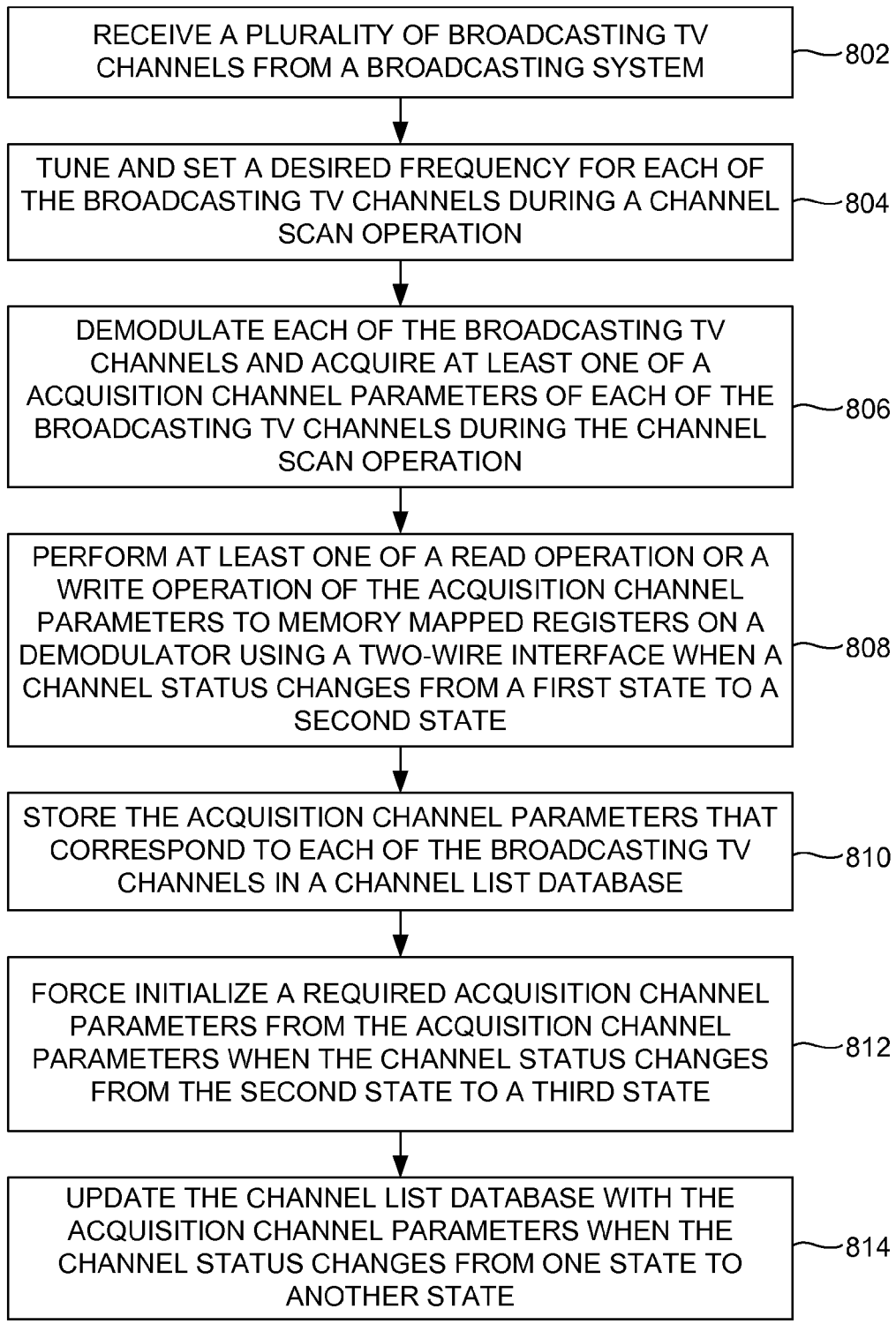
FIG. 8 is a flow diagram illustrating a method of performing faster channel switch times between a plurality of broadcasting TV channels with reduced latency in overall demodulation cycle for multiple demodulation standards in a communication receiver according to an embodiment herein.

FIG. 8 is a flow diagram illustrating a method of performing faster channel switch times between a plurality of broadcasting TV channels with reduced latency in overall demodulation cycle for multiple demodulation standards in a communication receiver 300 of FIG. 3 according to an embodiment herein. In one embodiment, the communication receiver 300 is a mobile TV receiver. In step 802, the one or more broadcasting TV channels are received from a broadcasting system. In step 804, a desired frequency is tuned and set for each of the broadcasting TV channels during a channel scan operation (e.g., using the tuner 302 of FIG. 3).

In step 806, each of the broadcasting TV channels is demodulated and the one or more acquisition channel parameters of each of the broadcasting TV channels are acquired during the channel scan operation (e.g., using the demodulator 304 of FIG. 3). In step 808, a read operation and/or a write operation of the acquisition channel parameters to memory mapped registers is performed on the demodulator 304 using an interface (e.g., the two wire interface or the low throughput interface) when a channel status switches from a first state to a second state.

In one embodiment, the application processor 306 of FIG. 3 performs the read operation and/or the write operation of the one or more acquisition channel parameters on the demodulator 304. In step 810, the one or more acquisition channel parameters that correspond to each of the broadcasting TV channels are stored in the channel list database 314. In one embodiment, the application processor 306 stores the one or more acquisition channel parameters in the channel list database 314. In step 812, a required acquisition channel parameters from the one or more acquisition channel parameters is forceably initialized when the channel status switches from the second state to a third state.

In one embodiment, the third state may be the first state. In another embodiment, the third state may be different from the first state. Further, one or more required acquisition channel parameters are forceably initialized when the channel status switches from one state to another state. In step 814, the channel list database 314 is updated with the one or more acquisition channel parameters when the channel status switches from one state to another state (e.g., from a first state to a second state or a third state or an 'nth' state). In one embodiment, the application processor 306 updates the channel list database 314 with the one or more acquisition channel parameters when the channel status switches from one state to another state.

Figure 9:
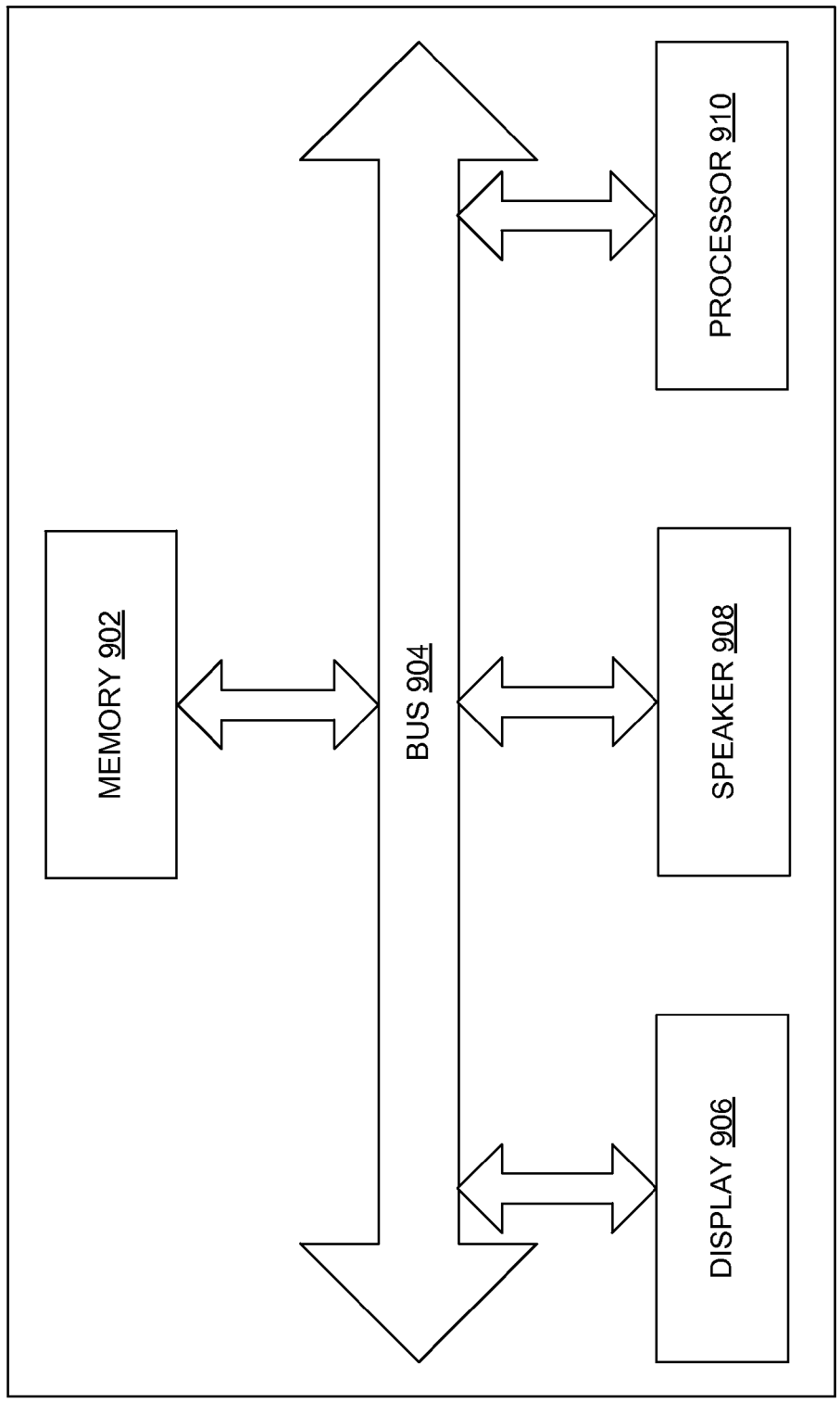
FIG. 9 illustrates an exploded view of the communication receiver of FIG. 3 that includes a memory having a set of computer instructions, a bus, a display, a speaker, and a processor capable of processing a set of computer instructions to perform any one or more of the methodologies herein, according to an embodiment herein.

FIG. 9 illustrates an exploded view of the communication receiver 300 of FIG. 3 that includes a memory 902 having a set of computer instructions, a bus 904, a display 906, a speaker 908, and a processor 910 capable of processing a set of computer instructions to perform any one or more of the methodologies herein, according to an embodiment herein. The processor 910 may also enable digital content to be consumed in the form of video for output via one or more displays 906 or audio for output via speaker and/or earphones 908. In one embodiment, the display 906 is the same display 308 of FIG. 3.

The processor 910 may also carry out the methods described herein and in accordance with the embodiments herein. Digital content may also be stored in the memory 902 for future processing or consumption. The memory 902 may also store program specific information and/or service information (PSI/SI), including information about digital content (e.g., the detected information bits) available in the future or stored from the past.

A user of the receiver 300 may view this stored information on display 906 and select an item for viewing, listening, or other uses via input, which may take the form of keypad, scroll, or other input device(s) or combinations thereof. When digital content is selected, the processor 910 may pass information. The content and PSI/SI may be passed among functions within the receiver 300 using bus 904. In one embodiment, the processor 910 may be the same application processor 306 of FIG. 3 that performs the read operation and/or write operation of the one or more acquisition parameters on the demodulator 304 of FIG. 3.

The communication receiver 300 includes an application processor (e.g., the application processor 306 of FIG. 3) that performs the read operation and/or write operation of the one or more acquisition parameters on the demodulator 304. The application processor 306 of the receiver 300 further enables faster channel switch times by reducing the acquisition times in demodulation cycle for multiple demodulation standards (e.g., reduces latency in overall demodulation cycle for multiple demodulation standards). The application processor 306 further enables reuse of the memory (e.g., the flash drive) for acquisition mode and tracking mode codes which thus provides reduced code and memory data requirements. The binary data of these codes and data memory are compressed such that code download timings are reduced. Additionally, the code download timings are further reduced by transferring only the required tracking mode depending on the acquisition stage parameters (e.g., the one or more acquisition channel parameters as shown in FIG. 5).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A Television (TV) receiver for faster channel switch times between a plurality of broadcasting TV channels with reduced latency in overall demodulation cycle for multiple demodulation standards, said TV receiver comprising:

a tuner that receives said plurality of broadcasting TV channels from a broadcasting system, wherein said tuner performs a tuning operation and sets a desired frequency for each of said broadcasting TV channels during a channel scan operation;

a demodulator coupled to said tuner, wherein said demodulator demodulates each of said broadcasting TV channels and acquires at least one acquisition channel parameter of each of said broadcasting TV channels during said channel scan operation; and an application processor coupled to said demodulator via an interface, wherein said application processor performs at least one of a read operation and a write operation of said acquisition channel parameters to memory mapped registers on said demodulator when a channel status switches from a first state to a second state, wherein said application processor downloads at least one of (i) a compression code, (ii) an acquisition mode code, and (iii) a tracking mode code on to said demodulator when said channel switch status changes for different modulation types based on said acquisition channel parameters, said application processor comprising:

a channel list database that stores said acquisition channel parameters that correspond to each of said broadcasting TV channels, wherein said application processor updates said channel list database with said acquisition channel parameters and forcibly initializes a required acquisition channel parameter from said acquisition channel parameters when said channel status switches from one state to another state.

2. The TV receiver of claim 1, wherein said application processor performs said read operation and said write operation of a tap value of time domain equalizer acquisition channel parameters for a single carrier based digital demodulation standard.

3. The TV receiver of claim 1, wherein said application processor performs said read operation and said write operation of (i) a Fast Fourier Transform (FFT) mode estimate, (ii) a guard interval estimate, and (iii) a frequency/sampling time locking acquisition channel parameter on said demodulator for a multi-carrier cyclic prefix based OFDM digital demodulation standard, wherein only said tracking mode code is transferred based on different modulation types on received acquisition channel parameters.

4. The TV receiver of claim 1, wherein said application processor performs said read operation and said write operation of (i) a Carrier Frequency Offset (CFO) estimate and (ii) an Automatic Gain Control (AGC) value for multiple digital and analog demodulation standards, wherein transfer of a binary data of said codes is performed on a stage basis.

5. The TV receiver of claim 4, wherein said application processor transfers said acquisition mode code and said tracking mode code on said demodulator, wherein said compression code reduces transfer code timing for said binary data, wherein only (i) required tracking mode code and (ii) said read and write operations are over written on an acquisition mode code that corresponds to a particular acquisition channel parameter of said acquisition channel parameters.

6. A television (TV) receiver for faster channel switch times between a plurality of broadcasting TV channels with reduced latency in overall demodulation cycle for multiple demodulation standards, said TV receiver comprising:
 a memory unit comprising a set of instructions;
 a display unit coupled to said memory unit;
 a tuner that receives said plurality of broadcasting TV channels from a broadcasting system, performs a tuning operation, and sets a desired frequency for each of said broadcasting TV channels during a channel scan operation;
 a demodulator that demodulates each of said broadcasting TV channels and acquires at least one acquisition channel parameter of each of said broadcasting TV channels during said channel scan operation;
 an application processor comprising:
  a control processor that is coupled to said demodulator via an interface,
  a video and audio processing unit that processes video and audio content that corresponds to each of said plurality of broadcasting TV channels, and
  a channel list database, wherein said application processor is adapted to:
   perform at least one of a read operation or a write operation of said acquisition channel parameters to memory mapped registers on said demodulator when a channel status switches from a first state to a second state;
   download at least one of (i) a compression code, (ii) an acquisition mode code, and (iii) a tracking mode code from said application processor on to said demodulator when said channel status switches for different modulation types based on said acquisition channel parameters; and
   store and update said acquisition channel parameters that correspond to each of said broadcasting TV channels in said channel list database, and further forcibly initialize a required acquisition channel parameter from said acquisition channel parameters when said channel status switches from one state to another state.

7. A method of performing faster channel switch times between a plurality of broadcasting TV channels with reduced latency in overall demodulation cycle for multiple demodulation standards in a Television (TV) receiver, said method comprising:
 receiving said plurality of broadcasting TV channels from a broadcasting system;
 tuning and setting a desired frequency for each of said broadcasting TV channels during a channel scan operation;
 demodulating each of said broadcasting TV channels and acquiring at least one acquisition channel parameter from a plurality of acquisition channel parameters of each of said broadcasting TV channels during said channel scan operation;
 performing at least one of a read operation or a write operation of said acquisition channel parameters to memory mapped registers on a demodulator using an interface when a channel status switches from a first state to a second state; and
 forcibly initializing a required acquisition channel parameter from said acquisition channel parameters when said channel status switches from said second state to a third state.

8. The method of claim 7, further comprising storing said acquisition channel parameters that correspond to each of said broadcasting TV channels in a channel list database.

9. The method of claim 7, further comprising updating said channel list database with said acquisition channel parameters when said channel status switches from one state to another state.

10. A communication receiver for faster channel switch times between a plurality of communication channels with reduced latency in overall demodulation cycle for multiple demodulation standards, said communication receiver comprising:
 a tuner that receives said plurality of communication channels from a communication system, wherein said tuner performs a tuning operation and sets a desired frequency for each of said communication channels during a channel scan operation;
 a demodulator coupled to said tuner, wherein said demodulator demodulates each of said communication channels and acquires at least one acquisition channel parameter of each of said communication channels during said channel scan operation; and
 an application processor coupled to said demodulator via an interface, wherein said application processor performs at least one of a read operation and a write operation of said acquisition channel parameters to memory mapped registers on said demodulator when a channel status switches from a first state to a second state, wherein said application processor downloads at least one of (i) a compression code, (ii) an acquisition mode code, and (iii) a tracking mode code on to said demodulator when said channel status switches for different modulation types based on said acquisition channel parameters, said application processor comprising:
  a channel list database that stores said acquisition channel parameters that correspond to each of said communication channels, wherein said application processor updates said channel list database with said acquisition channel parameters and forcibly initializes at least one required acquisition channel parameter from said acquisition channel parameters when said channel status switches from one state to another state.

11. The communication receiver of claim 10, wherein said application processor performs said read operation and said write operation of (i) a Carrier Frequency Offset (CFO) estimate and (ii) an Automatic Gain Control (AGC) value for multiple digital and analog demodulation standards, wherein transfer of binary data of said codes is performed on a stage basis.

12. The communication receiver of claim 10, wherein said application processor transfers said acquisition mode code and said tracking mode code on said demodulator, wherein said reduced compression code reduces transfer code timing for a binary code, wherein only required tracking mode code, and said read and write operations are over written on an acquisition mode code that corresponds to a particular acquisition channel parameter of said acquisition channel parameters.

* * * * *